US010330881B1

(12) United States Patent
Wittmeier et al.

(10) Patent No.: US 10,330,881 B1
(45) Date of Patent: Jun. 25, 2019

(54) OPTICAL FIBER FURCATION ASSEMBLIES

(71) Applicant: AFL Telecommunications LLC, Duncan, SC (US)

(72) Inventors: David Wittmeier, Greer, SC (US); Louis Guzzo, Inman, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/850,822

(22) Filed: Dec. 21, 2017

(51) Int. Cl.
*G02B 6/44* (2006.01)
*G02B 6/38* (2006.01)
*G02B 6/46* (2006.01)

(52) U.S. Cl.
CPC ......... *G02B 6/4471* (2013.01); *G02B 6/3878* (2013.01); *G02B 6/444* (2013.01); *G02B 6/4497* (2013.01); *G02B 6/3869* (2013.01); *G02B 6/3887* (2013.01); *G02B 6/46* (2013.01)

(58) Field of Classification Search
None
See application file for complete search history.

(56) References Cited

U.S. PATENT DOCUMENTS

| 5,239,609 | A | 8/1993 | Auteri |
| 6,278,831 | B1 | 8/2001 | Henderson et al. |
| 6,623,173 | B1* | 9/2003 | Grois ............... G02B 6/3878 385/76 |
| 6,738,555 | B1 | 5/2004 | Cooke et al. |
| 7,636,507 | B2* | 12/2009 | Lu .................... G02B 6/3825 385/135 |
| 7,711,236 | B2 | 5/2010 | Gonzalez et al. |
| 8,086,085 | B2* | 12/2011 | Lu .................... G02B 6/3825 385/134 |
| 9,395,509 | B2* | 7/2016 | Petersen ........... G02B 6/4471 |
| 9,417,420 | B2 | 8/2016 | Fisher et al. |
| 9,529,173 | B2 | 12/2016 | Courchaine et al. |
| 2005/0100286 | A1* | 5/2005 | Cox .................. G02B 6/3887 385/86 |

(Continued)

FOREIGN PATENT DOCUMENTS

EP 1736808 A2 12/2006

OTHER PUBLICATIONS

AFL Telecommunications LLC; International Patent Application No. PCT/US2018/066411; International Search Report; Mar. 27, 2019; (2 pages).

*Primary Examiner* — Sung H Pak
(74) *Attorney, Agent, or Firm* — Dority & Manning, P.A.

(57) ABSTRACT

A furcation assembly includes a body defining a furcation block receiving portion and a cable receiving portion. The furcation assembly further includes a furcation block positioned within the furcation block receiving portion, and a cable retainer disposed within the cable receiving portion. The furcation assembly further includes a housing receivable around the body such that the furcation block and cable retainer are disposed within the housing. In some embodiments, the cable retainer includes a crimp wing crimpable into contact with the multiple fiber cable to retain the multiple fiber cable, the crimp wing including a burr. In some embodiments, the body including a longitudinally extending rail, the housing defines an interior and a longitudinally extending slot, and the rail extends into the slot when the housing is received around the body.

18 Claims, 4 Drawing Sheets

(56) References Cited

U.S. PATENT DOCUMENTS

2008/0138026 A1\* 6/2008 Yow ................ G02B 6/4471
385/137
2009/0190889 A1 7/2009 Robinson
2016/0124174 A1\* 5/2016 Courchaine .......... G02B 6/4471
385/137
2017/0184806 A1\* 6/2017 Marius Goleret ... G02B 6/4466

\* cited by examiner

OPTICAL FIBER FURCATION ASSEMBLIES

FIELD

The present disclosure relates generally to furcation assemblies for furcating optical fibers of multiple fiber cables.

BACKGROUND

The ability of high-quality optical fiber to transmit large amounts of information without appreciable signal degradation is well known. As a result, optical fibers have found widespread use in many applications, such as voice and data transmission. Particularly in the private network and industrial markets, there is a continuing trend in which copper-based wiring is being replaced with fiber optic cabling for communication and sensing applications.

Optical fiber is typically supplied and installed as fiber optic cable. The term "fiber optic cable" refers to the combination of the actual optical fiber plus the structure in which it is carried and protected during and after installation. A fiber optic cable may include, for example, optical fiber(s), aramid fibers or other strength members, and an outer jacket. Multiple optical fibers are often combined in a multi-fiber cable. Multi-fiber cables efficiently carry the requisite number of fibers to the point(s) of applied use, where it is then necessary to separate each individual optical fiber and terminate the individual optical fibers with fiber optic connectors.

Furcation assemblies generally serve as a means to facilitate the separation of optical fibers of multi-fiber cables by providing a protective housing for transitioning the individual optical fibers from the multi-fiber cable. However, improvements could be made to currently known furcation assembly designs.

For example, one issue with many known furcation assembly designs is that the multi-piece designs are complicated to assemble. In particular, in many cases it is easy for users to assemble certain components in incorrect orientations. Such incorrect assemblies can expose the optical fibers to contaminates due to the assemblies not sealing properly, or can delay the assembly time once the user realizes that the assembly is incorrect. Further, users in many cases are required to assemble the components in a certain specific order, and must start over or provide an unfinished assembly if such order is not followed.

Another issue is that many furcation assemblies are designed to fit a very narrow range of input cable sizes. Accordingly, many different varieties of furcation assemblies are required for different input cable sizes.

Accordingly, improved furcation assemblies are desired.

BRIEF DESCRIPTION

Aspects and advantages of the invention will be set forth in part in the following description, or may be obvious from the description, or may be learned through practice of the invention.

In accordance with embodiments of the present disclosure, a furcation assembly is disclosed for furcating a multiple fiber cable. The furcation assembly defines a longitudinal axis. The furcation assembly includes a body defining a furcation block receiving portion and a cable receiving portion, the body including a longitudinally extending rail. The furcation assembly further includes a furcation block positioned within the furcation block receiving portion, and a cable retainer disposed within the cable receiving portion. The furcation assembly further includes a housing receivable around the body such that the furcation block and cable retainer are disposed within the housing, the housing defining an interior and a longitudinally extending slot. The rail extends into the slot when the housing is received around the body.

In accordance with other embodiments of the present disclosure, a furcation assembly is disclosed for furcating a multiple fiber cable. The furcation assembly defines a longitudinal axis. The furcation assembly includes a body defining a furcation block receiving portion and a cable receiving portion. The furcation assembly further includes a furcation block positioned within the furcation block receiving portion, and a cable retainer disposed within the cable receiving portion. The cable retainer includes a crimp wing crimpable into contact with the multiple fiber cable to retain the multiple fiber cable, the crimp wing including a burr. The furcation assembly further includes a housing receivable around the body such that the furcation block and cable retainer are disposed within the housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
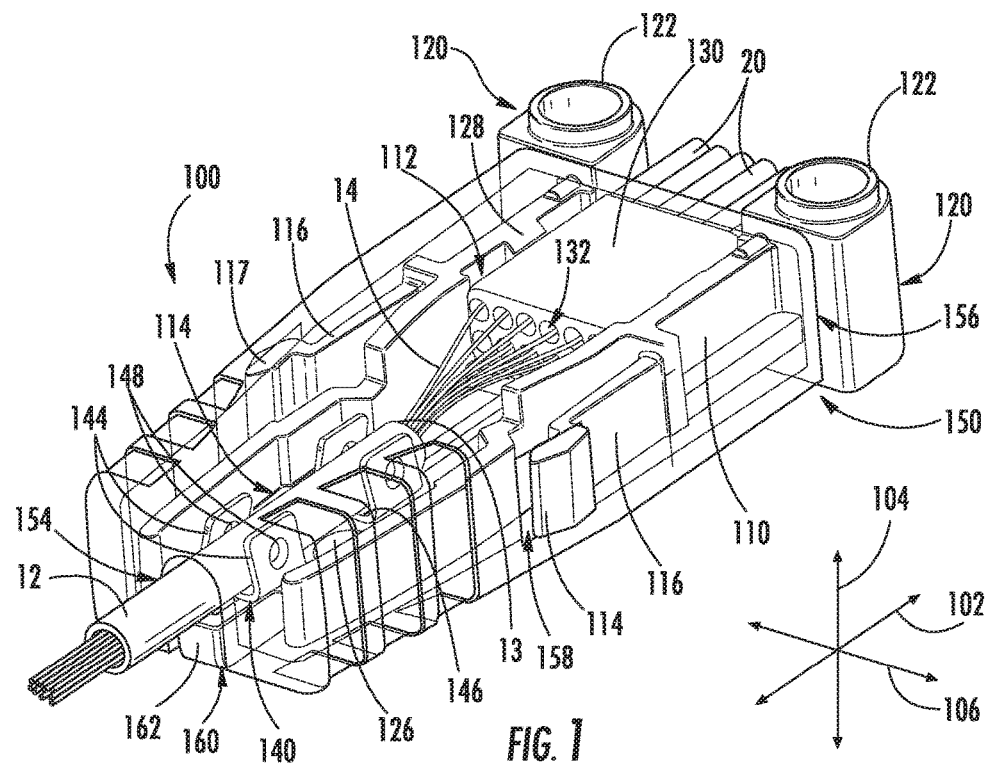
FIG. 1 is a perspective view of a furcation assembly assembled with and furcating a multiple fiber cable in accordance with embodiments of the present disclosure.
Figure 2:
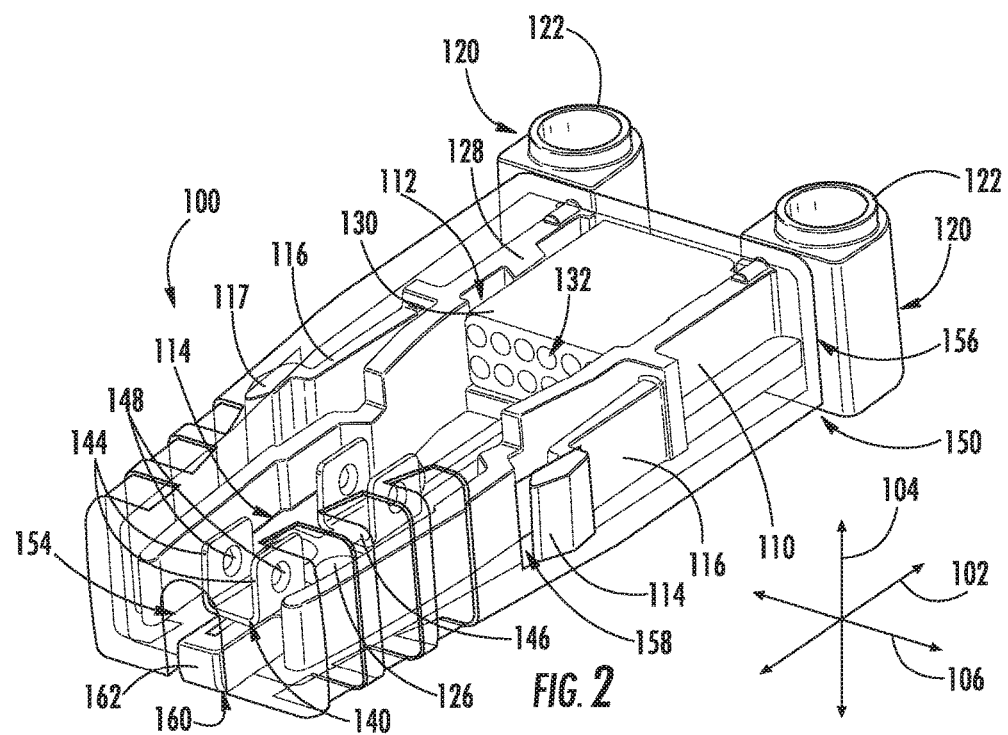
FIG. 2 is a top perspective view of a furcation assembly in accordance with embodiments of the present disclosure.
Figure 3:
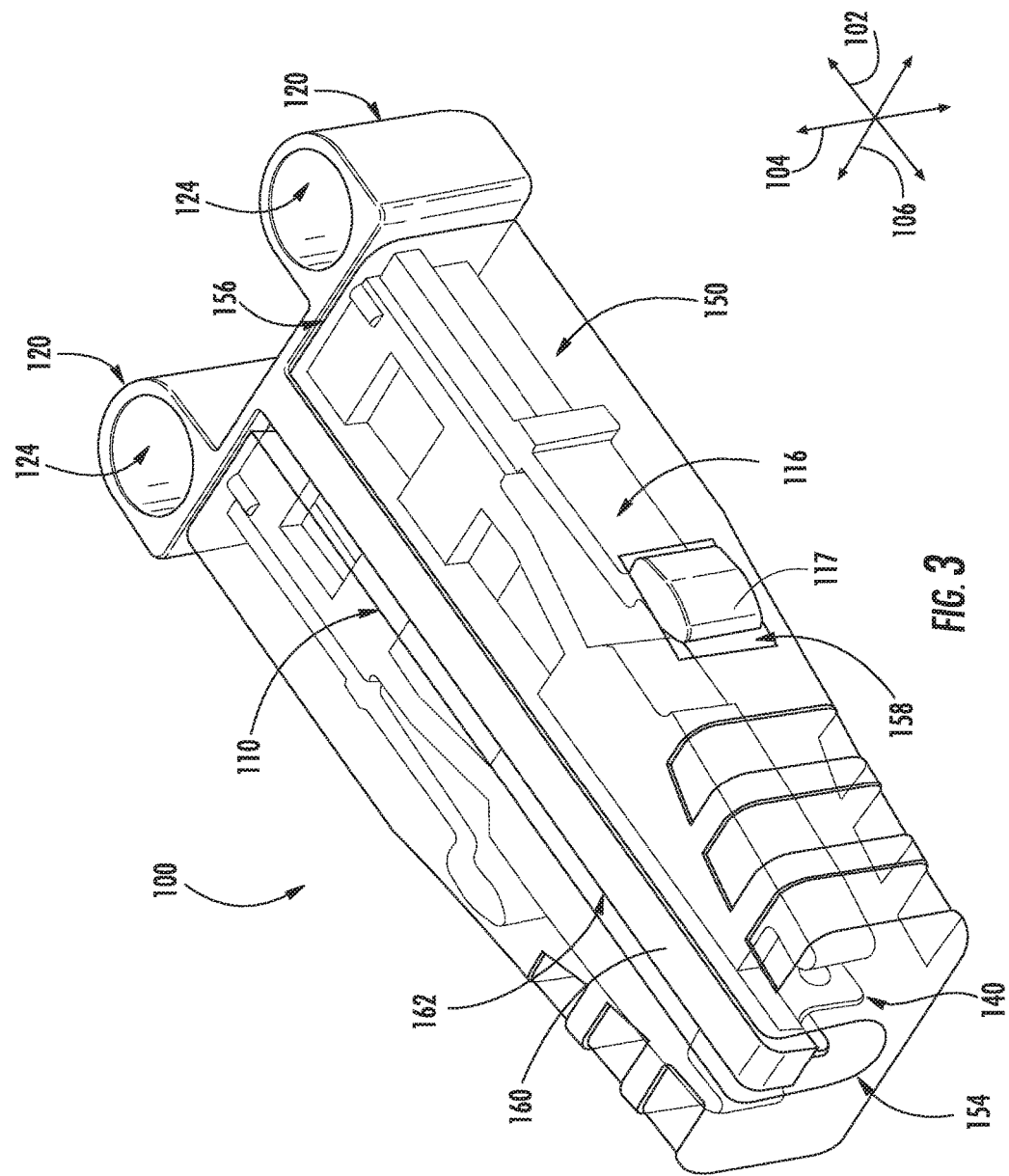
FIG. 3 is a bottom perspective view of a furcation assembly in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to furcation assemblies which include various advantageous features for improving the furcation of multiple fiber cables.

For example, in some embodiments, furcation assemblies in accordance with the present disclosure include features which facilitate the correct orientation of the various components of the furcation assembly during the assembly process thereof and eliminate the need for a specific assembly order to be followed. In particular, for example, a furcation assembly may include a body having a rail, and a cover having a slot, wherein the rail extends into the slot when the cover is received around the body in an assembled state. Because the rail must fit into the slot for the body and cover to fit together, correct orientation of these components is ensured. Further, having such slot in the cover eliminates the need for the cover to be installed on a cable before other assembly steps, such as installing fibers of the cable in a furcation block and securing the cable to the furcation assembly. The use of such slot allows the cover to advantageously be installed on the cable either before or after such other assembly steps occur.

In additional or alternative embodiments, furcation assemblies in accordance with the present disclosure include features which allow for increased flexibility in the size range of multiple fiber cable with which such furcation assemblies may be utilized. Such features may additionally provide improved security in the manner in which such cables are retained by the furcation assemblies. In particular, for example, a furcation assembly may include a cable retainer which includes one or more crimp wings. The crimp wings are crimpable into contact with the multiple fiber cable, and may include burrs which contact the multiple fiber cable when the crimp wings are crimped into such contact.

Referring now for example to FIG. 1, a multiple fiber cable 10 is illustrated. The multiple fiber cable 10 includes an outer jacket 12 and a plurality of optical fibers 14 extending from an end 13 of the outer jacket 12. As discussed herein, the optical fibers 14 may be inserted through a furcation block and from the furcation block into furcation tubes 20. Each furcation tube 20 may house one or more optical fibers 14, and may serve to protect the furcated optical fibers 14, as is generally understood.

Referring still to FIG. 1 as well as to FIGS. 2 through 6, furcation assemblies 100 are provided for furcating such multiple fiber cables 10. A furcation assembly 100 in accordance with the present disclosure may generally define a longitudinal axis 102, a vertical axis 104, and a transverse axis 106, all of which may be mutually orthogonal to define a coordinate system for the assembly 100.

Furcation assembly 100 may include a body 110 which extends along the longitudinal axis 102. Body 110 includes a furcation block receiving portion 112 and a cable receiving portion 114. Such portions 112, 114 are spaced apart along the longitudinal axis 102 and generally included within an interior of the body 110.

The body 110 may further include a plurality of arms 116, such as in exemplary embodiments a pair of arms 116. The arms 116 may be oppositely positioned relative to the body 110 along the transverse axis T, and may be biased outward from the body 110 along the transverse axis T. As discussed herein, the arms 116 may connect with mating apertures in a housing of the furcation assembly 100 when the housing is received around the body 110.

The body 110 may further include a plurality of stacking members 120, which may for example, be disposed at a longitudinal end of the body 110 which is distal from the end at which the cable 10 enters the body 110. Each stacking member 120 may serve to facilitate stacking of multiple furcation assemblies 110 on top of one another, such as along the vertical axis 104. Each stacking member 120 may include, for example, a pin 122 and a socket 124. The pin 122 and socket 124 may be disposed on opposite ends of the stacking member 120 along the vertical axis 104. The pin 122 may be inserted in the socket of a neighboring furcation assembly during stacking thereof. Similarly, the socket 124 may accept the pin 124 of a neighboring furcation assembly during stacking thereof.

Furcation assembly 100 may further include a furcation block 130. The furcation block 130 may define a plurality of furcation holes 132 through which optical fibers 14 extend when the furcation assembly 100 is assembled on a cable 10. Such furcation holes 132 may extend along the longitudinal axis 102. Furcation block 130 may be positioned within the furcation block receiving portion 112. In some embodiments, the furcation block 130 may be removable positionable within the furcation block receiving portion 112, and thus may be a separate component from the body 110. In other embodiments, the furcation block 130 may be fixedly positioned within the furcation block receiving portion 112, and in some embodiments may be integral with the body 110 such that the body 110 and furcation block 130 are formed as a single, unitary component.

In some embodiments, such as in embodiments wherein the furcation block 130 is separate and removable from the body 110, the body 110 may further include one or more tabs 128, such as in exemplary embodiments a plurality of tabs 128. Each tab 128 may extend into the furcation block receiving portion 112. Further, each tab 128 may secure the furcation block 130 when positioned within the furcation block receiving portion 112. For example, the furcation block 130 may be inserted into the furcation block receiving portion 112 along the vertical axis 104 past the tabs 128, which may then contact a top surface of the furcation block 130 to secure the furcation block in the furcation block receiving portion 112. Alternatively, the furcation block 130 may be inserted into the furcation block receiving portion 112 along the longitudinal axis 102 under the tabs 128, which may then contact a top surface of the furcation block 130 to secure the furcation block in the furcation block receiving portion 112.

Figure 4:
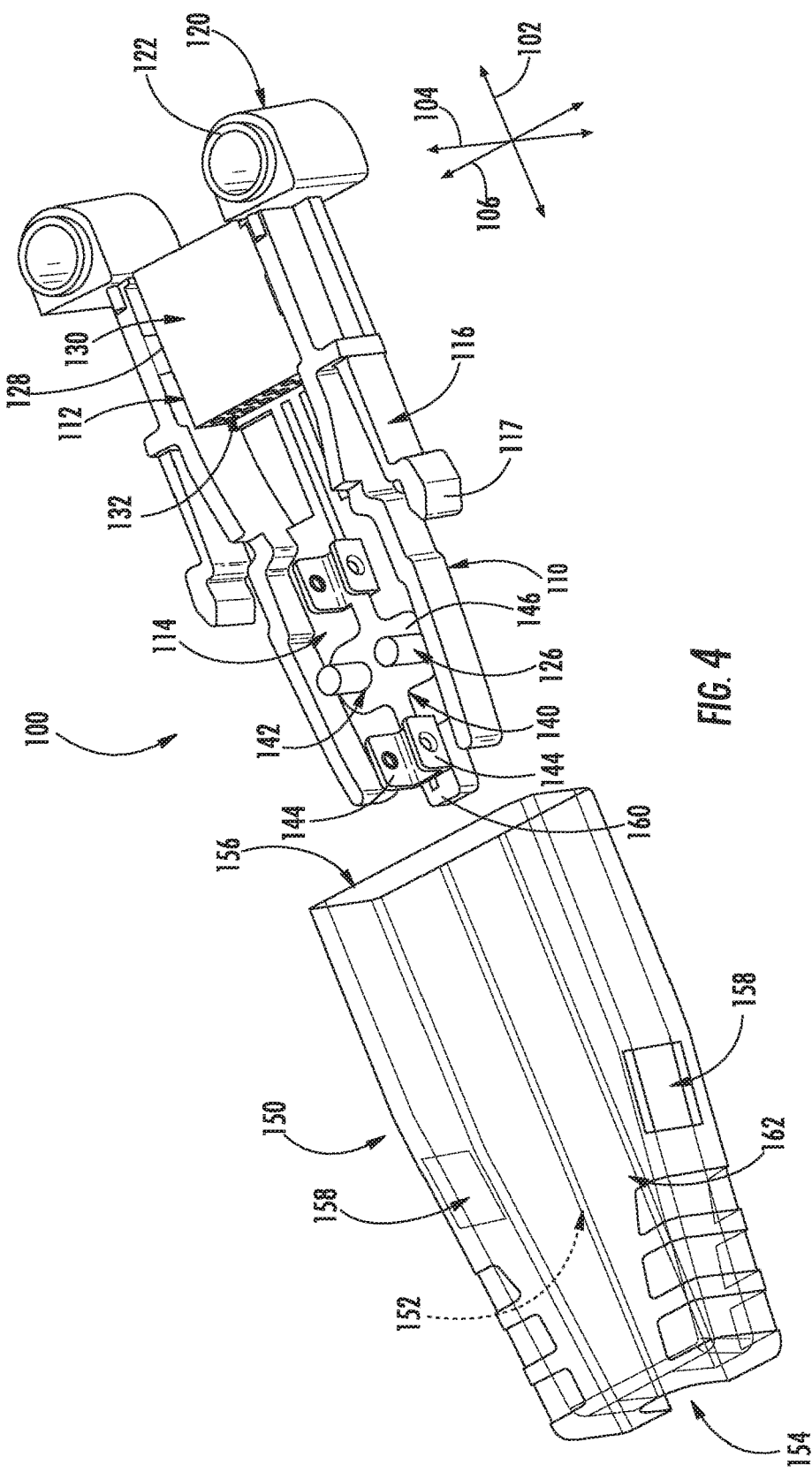
FIG. 4 is a top perspective view of a furcation assembly with a housing shown exploded from a body thereof in accordance with embodiments of the present disclosure.
Figure 5:
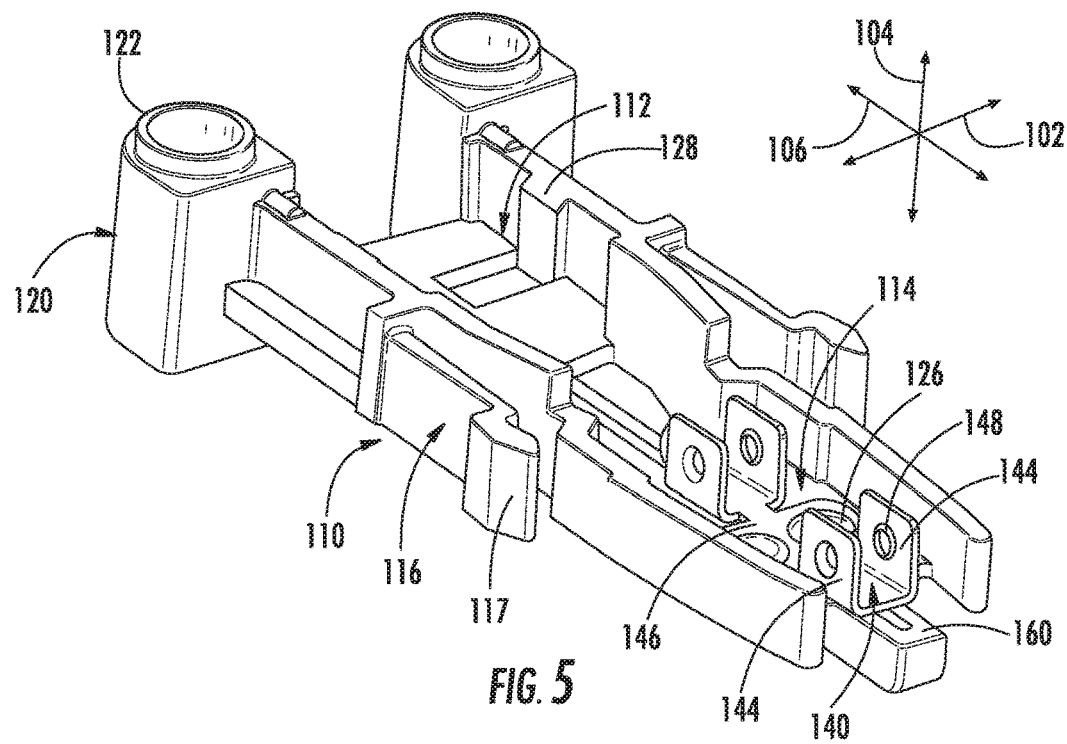
FIG. 5 is a top perspective view of a body and cable retainer of a furcation assembly in accordance with embodiments of the present disclosure.
Figure 6:
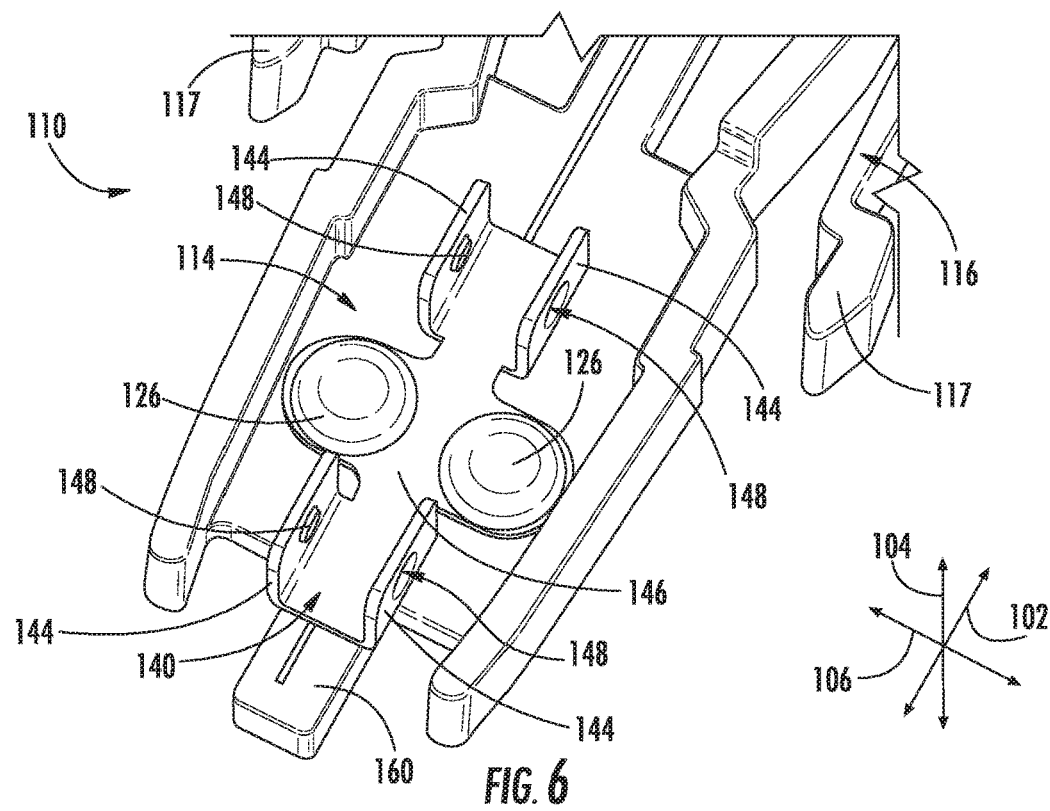
FIG. 6 is a close-up top perspective view of a body and cable retainer of a furcation assembly in accordance with embodiments of the present disclosure.

Furcation assembly 100 may further include a cable retainer 140, which may be disposed within the cable receiving portion 114. Cable retainer 140 may contact and retain the cable 10, such as the outer jacket 12 thereof, within the furcation assembly 100 when the furcation assembly 100 is assembled on the cable 10. In exemplary embodiments, the cable retainer 140 may be fastened to the body 110 in the cable receiving portion 114. For example, the cable retainer 140 may in some exemplary embodiments be ultrasonically fed to the body 110 in the cable receiving portion 114. As shown, in some ultrasonic welding embodiments, posts 126 are provided in body 110, such as in the cable receiving portion 114 thereof. The posts 126 may, for example, extend along the vertical direction 102. Holes 142 may be defined in the cable retainer 140, and the posts 126 may be inserted through the holes 142 to seat the cable retainer 140 within the cable receiving portion 114. The posts 126 may then be ultrasonically melted to ultrasonically weld the cable retainer 140 to the body 110 within the cable receiving portion 114. FIG. 4 illustrates the posts 126 before ultrasonic welding thereof, and FIGS. 5 and 6 illustrate the posts 126 after such ultrasonic welding.

In some exemplary embodiments, the cable retainer 140 includes one or more crimp wings 144, which may extend from a base 146. The base 146 may define the holes 142. In some exemplary embodiments, one or more pairs of crimp wings 144 are provided. Each crimp wing 144 may be crimpable into contact with the cable 10 to retain the cable 10. For example, during assembly, the cable 10, such as the outer jacket 12 thereof, may be placed in cable receiving portion 114 and in contact with the cable retainer 140. In exemplary embodiments, the cable 10, such as the outer jacket 12 thereof, may be placed between the crimp wings 144 of one or more pairs of crimp wings 144. The crimp wings 144 may then be bent or otherwise crimped into contact with cable 10 to secure the cable 10 in the cable receiving portion 114. For example, in exemplary embodiments each pair of crimp wings 144 captures the cable 10 between the crimp wings 144 thereof.

In some exemplary embodiments, one or more crimp wings 144 includes a burr 148 extending therefrom. Burr 148 is generally a protrusion extending inwardly from a crimp wing 144. For example, in exemplary embodiments as shown, burr 148 is formed by forming a hole in a crimp wing 144, whereby the portion of the crimp wing 144 forming the area in which the hole is formed then forms a burr 148. When a crimp wing 144 contacts a cable 10, such as the outer jacket 12 thereof, the burr 148 may serve to further facilitate securing of cable 10 in the cable receiving portion 114 by contacting and in some embodiments embedding into the outer jacket 12.

Furcation assembly 100 may further include a housing 150 which is receivable around the body 110. For example, when the housing 150 is received around the body 110, the furcation block receiving portion 112 and cable receiving portion 114 may be disposed within the housing 150, such as in an interior 152 defined by the housing 150. Further, the furcation block 130 and cable retainer 140 may be disposed within the housing 150, such as in the interior 152.

Housing 150 may be received around the body 110 along the longitudinal axis 102. For example, the housing 150 may be slid in the longitudinal axis 102 over the body 110 until the furcation block receiving portion 112 and cable receiving portion 114 may be disposed within the housing 150. In some embodiments, the stacking members 120 are exposed and thus not disposed within housing 150.

In exemplary embodiments, housing 150 is a one-piece housing. Alternatively, however, housing 150 may be formed from two or more pieces.

Housing 150 may have a first end and a second end which are separated from each other along the longitudinal axis 102 and which define a first end opening 154 and second end opening 156 respectively. When assembled, the cable 10 (such as the outer jacket 12 thereof) may extend through the first end opening 154. Further, the furcated optical fibers 14 and furcation tubes 20 may extend through the second opening 156.

In some embodiments, housing 150 may further define one or more apertures 158, such as in exemplary embodiments a plurality of apertures 158. Apertures 158 may be disposed between the first and second end openings 154, 156, respectively. Further, the apertures 158 may be oppositely positioned relative to the housing 150 along the transverse axis T. Each aperture 158 may interact with an arm 116, such as the distal end 117 thereof, to securely connect the housing 150 to the body 110 when the housing 150 is received around the body 110. For example, the distal end 117 of each arm 116 may extend into an aperture 158 when the housing 150 is received around body 110, and this insertion of the distal ends 117 into the apertures 158 may removably secure the housing 150 to the body 110.

In exemplary embodiments, the body 110 may further include a rail 160. Rail 160 may extend along the longitudinal axis 102. Further, in some exemplary embodiments, rail 160 may be a base rail which is located on the bottom of the body 110 along the vertical axis 104. Alternatively, rail 160 may be a side rail which is located on a side of the body 110 along the transverse axis 106, or a top rail which is located on the top of the body 110 along the vertical axis 104.

Rail 160 may serve to orient the housing 150 relative to the body 110, thus ensuring that the housing 150 is received around the body 110 in the correct orientation. To facilitate such orientation, housing 150 may define a slot 162 which extends along the longitudinal axis 102. Slot 162 may, for example, extend from the first end opening 154 to the second end opening 156, and thus extend along the entire longitudinal length of the housing 150. When the housing 150 is being assembled onto the body 110 in the correct orientation, the rail 160 may be inserted into the slot 162. Accordingly, the rail 160 may extend into the slot 162 when the housing 150 is received around the body 110. However, when the housing 150 is being assembled onto the body 110 but is not in the correct orientation, the rail 160 may not be aligned with the slot 162, and may further contact the housing 150 and prevent the housing 150 from being received around the body 110. Accordingly, correct orientation of the housing 150 relative to the body 110 is facilitated via alignment of the rail 160 and slot 162.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A furcation assembly for furcating, a multiple fiber cable, the furcation assembly defining a longitudinal axis, the furcation assembly comprising:
    a body defining a furcation block receiving portion and a cable receiving portion, the body comprising a longitudinally extending rail;
    a furcation block positioned within the furcation block receiving portion;
    a cable retainer disposed within the cable receiving portion; and
    a housing receivable around the body such that the furcation block and cable retainer are disposed within the housing, the housing defining an interior and a longitudinally extending slot, the slot defined through an interior surface and an exterior surface of the housing, wherein the rail extends into the slot when the housing is received around the body.

2. The furcation assembly of claim 1, wherein the body comprises a plurality of tabs extending into the furcation block receiving portion, the tabs securing the furcation block when positioned within the furcation block receiving portion.

3. The furcation assembly of claim 1, wherein the body comprises a plurality of arms and the housing defines a plurality of apertures, and wherein each of the plurality of arms extends into one of the plurality of apertures when the housing is received around the body.

4. The furcation assembly of claim 1, wherein the body further comprises a plurality of stacking members, each of the plurality of stacking members comprising a pin and a socket.

5. The furcation assembly of claim 1, wherein the cable retainer comprises a crimp wing, the crimp wing crimpable into contact with the multiple fiber cable to retain the multiple fiber cable.

6. The furcation assembly of claim 5, wherein the crimp wing is a pair of crimp wings.

7. The furcation assembly of claim 5, wherein the crimp wing comprises a burr.

8. The furcation assembly of claim 1, wherein the cable retainer is ultrasonically welded to the body in the cable receiving portion.

9. The furcation assembly of claim 1, wherein the housing is received around the body along the longitudinal axis.

10. The furcation assembly of claim 1, wherein the housing is a one-piece housing.

11. A furcation assembly for furcating a multiple fiber cable, the furcation assembly defining a longitudinal axis, the furcation assembly comprising:
 a body defining a furcation block receiving portion and a cable receiving portion;
 a furcation block positioned within the furcation block receiving portion;
 a cable retainer disposed within the cable receiving portion, the cable retainer comprising a crimp wing crimpable into contact with the multiple fiber cable to retain the multiple fiber cable, the crimp wing comprising a burr; and
 a housing receivable around the body such that the furcation block and cable retainer are disposed within the housing, the housing defining an interior and a longitudinally extending slot, the slot defined through an interior surface and an exterior surface of the housing.

12. The furcation assembly of claim 11, wherein the body comprises a plurality of tabs extending into the furcation block receiving portion, the tabs securing the furcation block when positioned within the furcation block receiving portion.

13. The furcation assembly of claim 11, wherein the body comprises a plurality of arms and the housing defines a plurality of apertures, and wherein each of the plurality of arms extends into one of the plurality of apertures when the housing is received around the body.

14. The furcation assembly of claim 11, wherein the body further comprises a plurality of stacking members, each of the plurality of stacking members comprising a pin and a socket.

15. The furcation assembly of claim 11, wherein the crimp wing is a pair of crimp wings.

16. The furcation assembly of claim 11, wherein the cable retainer is ultrasonically welded to the body in the cable receiving portion.

17. The furcation assembly of claim 11, wherein the housing is received around the body along the longitudinal axis.

18. The furcation assembly of claim 11, wherein the housing is a one-piece housing.

* * * * *